H. A. W. WOOD.
MACHINE FOR CASTING, FINISHING, AND COOLING STEREOTYPE PRINTING PLATES.
APPLICATION FILED OCT. 17, 1912. RENEWED OCT. 13, 1919.
1,341,608.
Patented May 25, 1920.
9 SHEETS—SHEET 7.
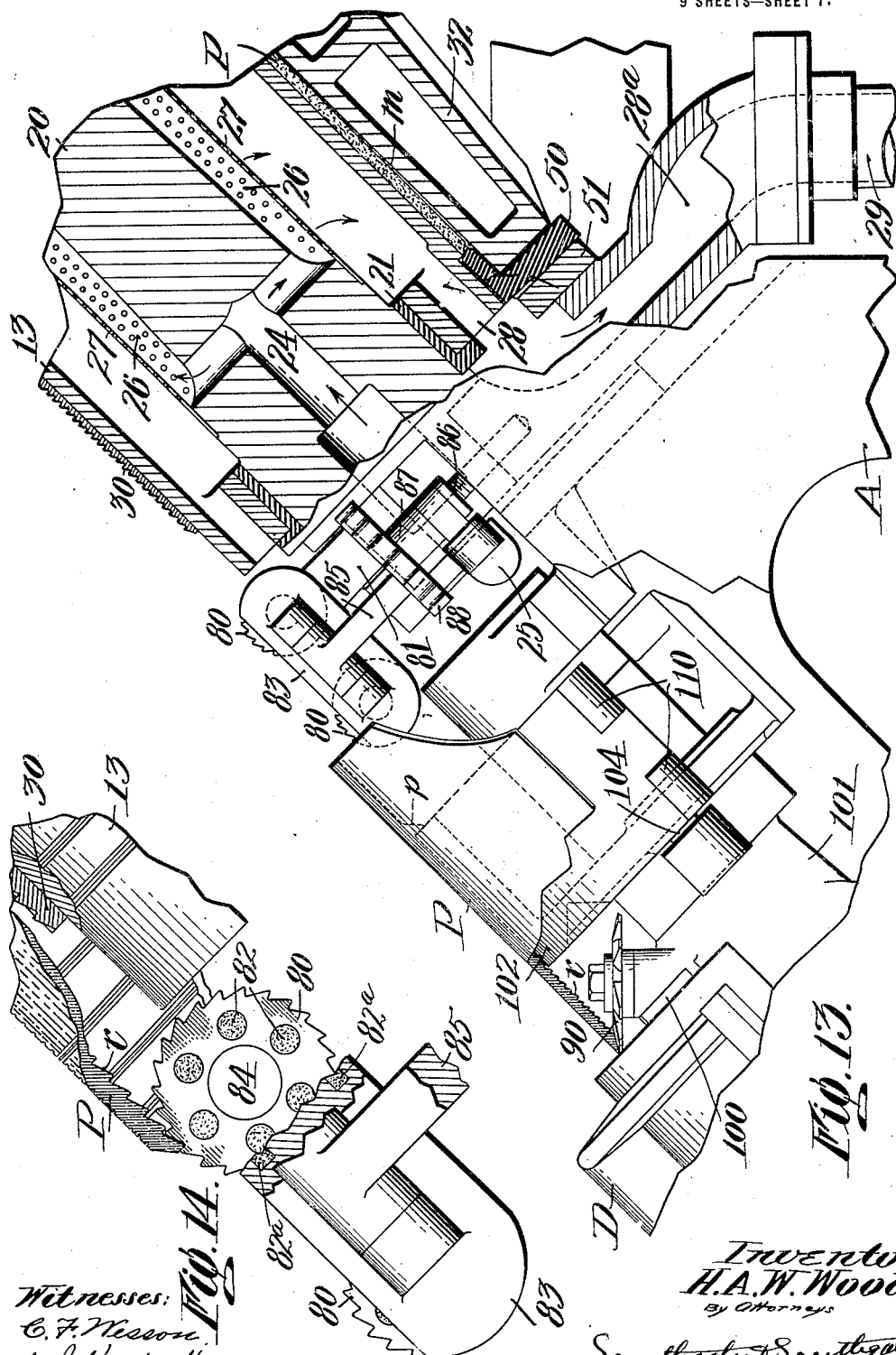

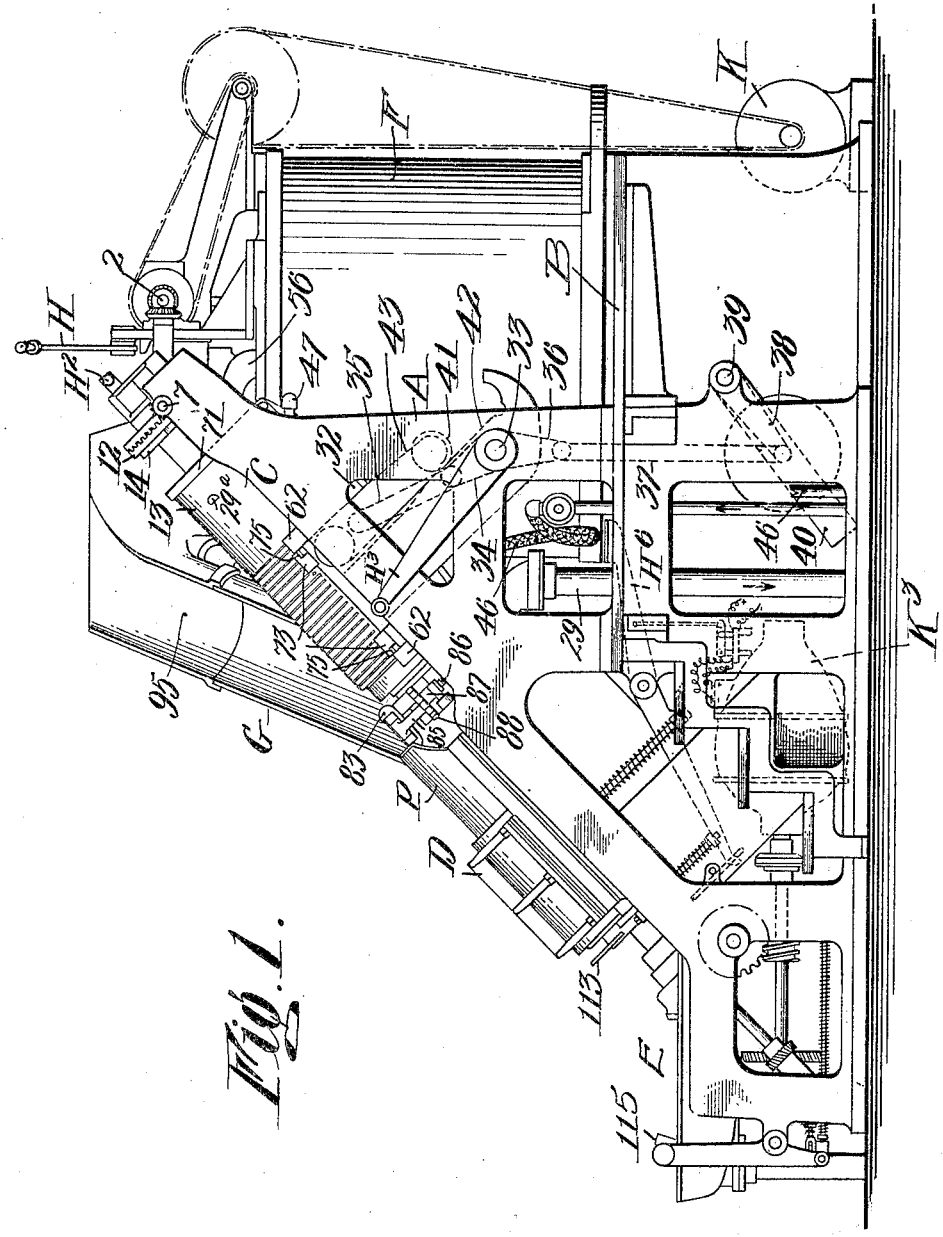

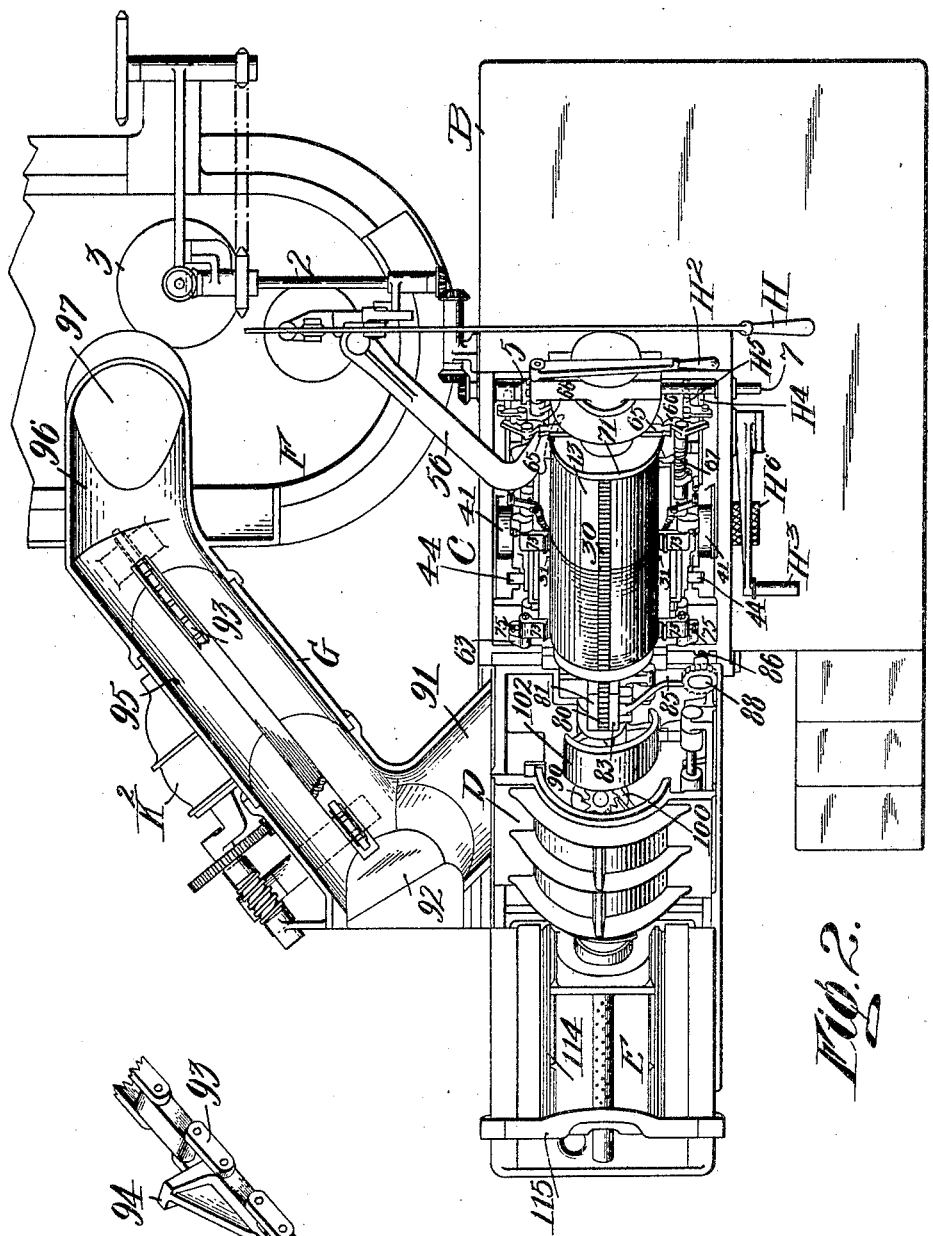

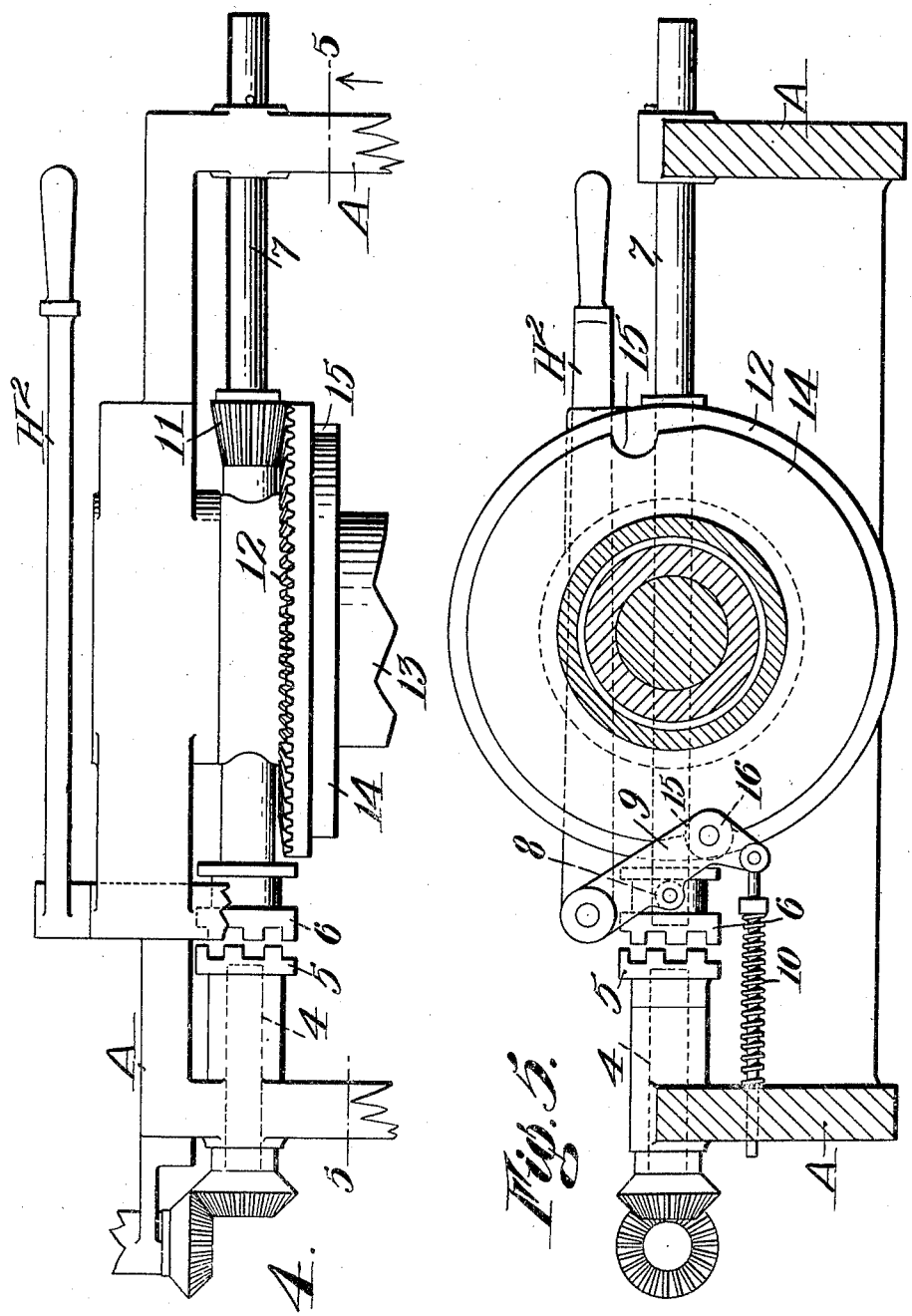

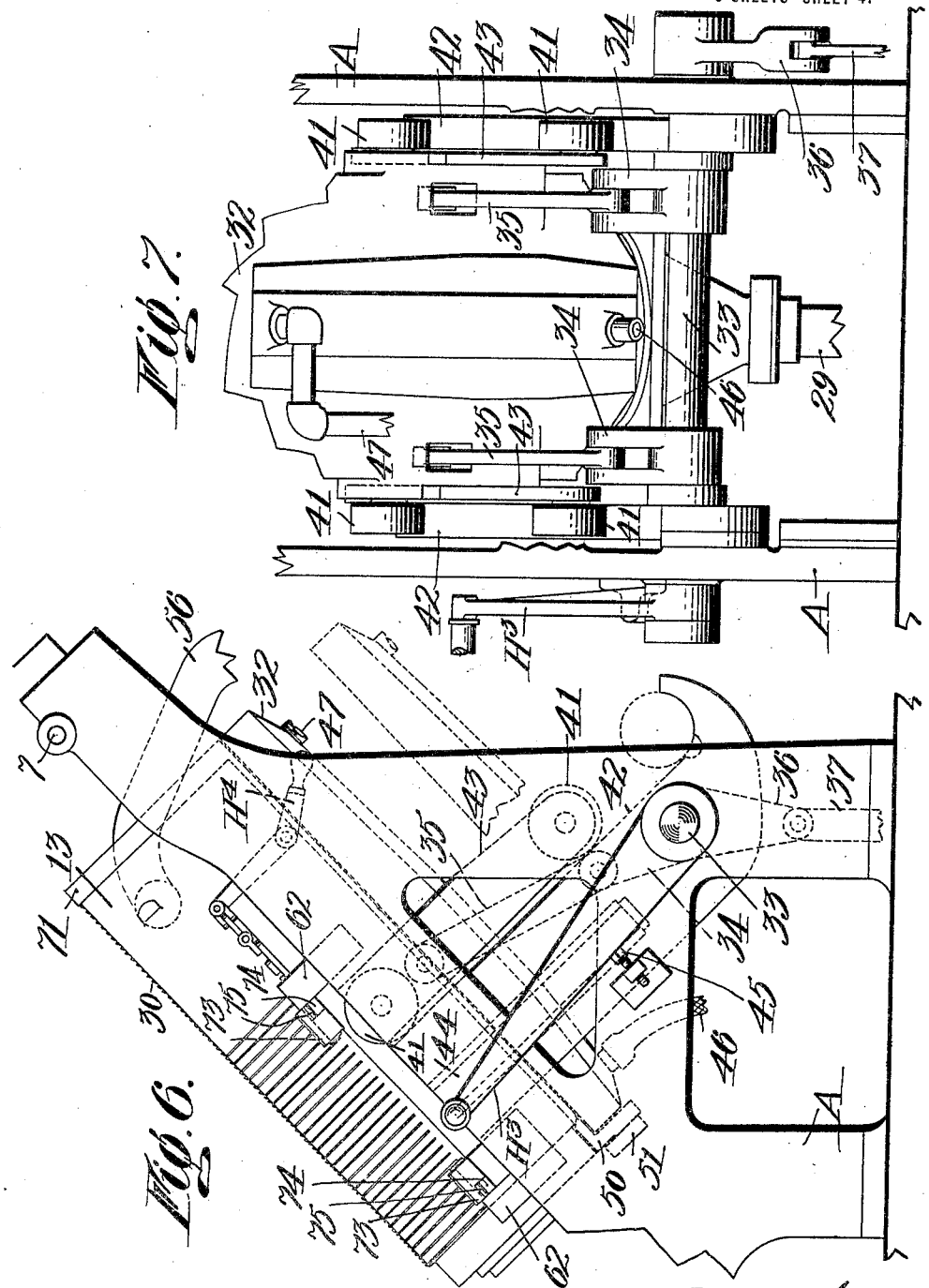

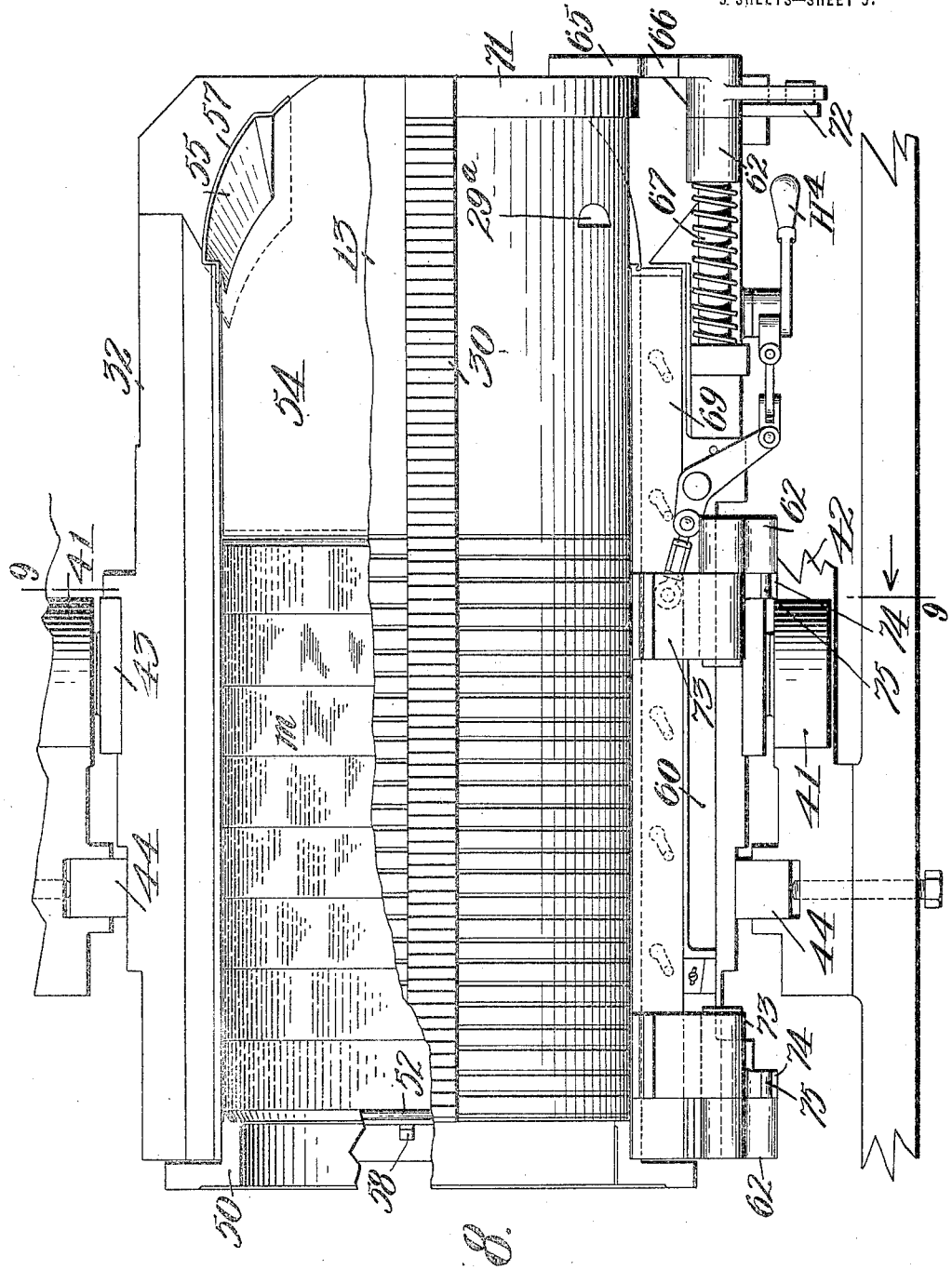

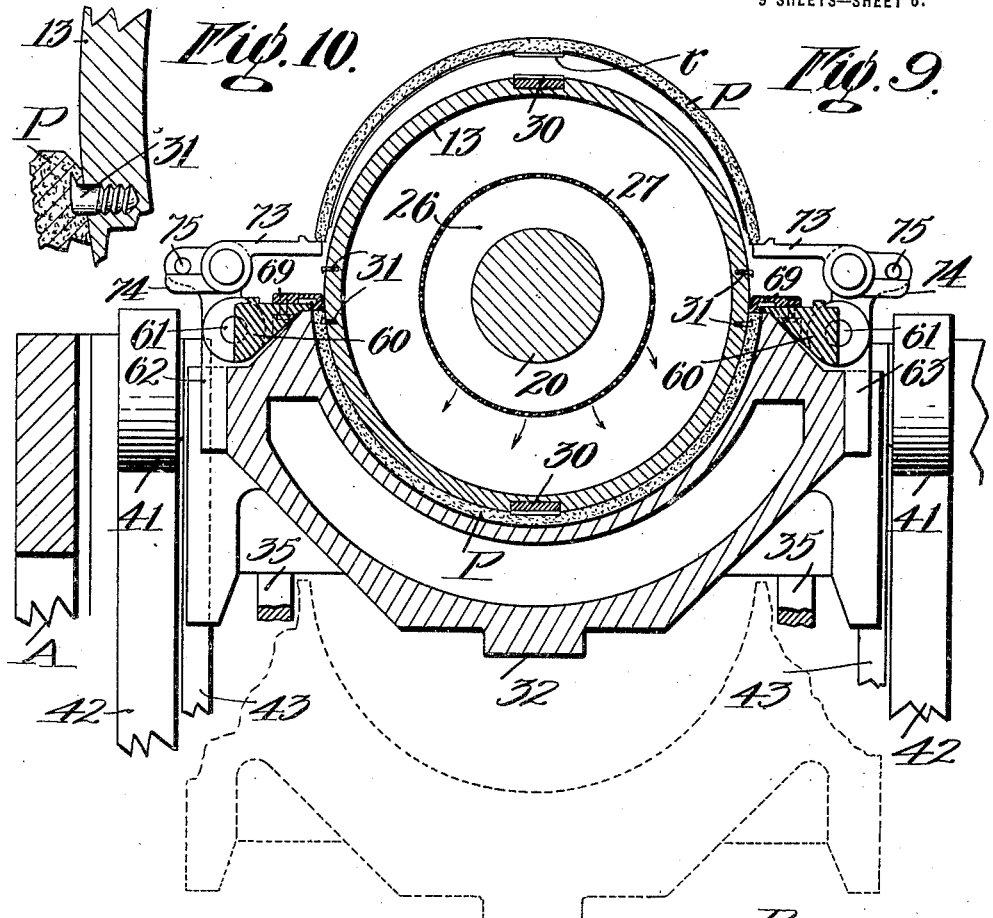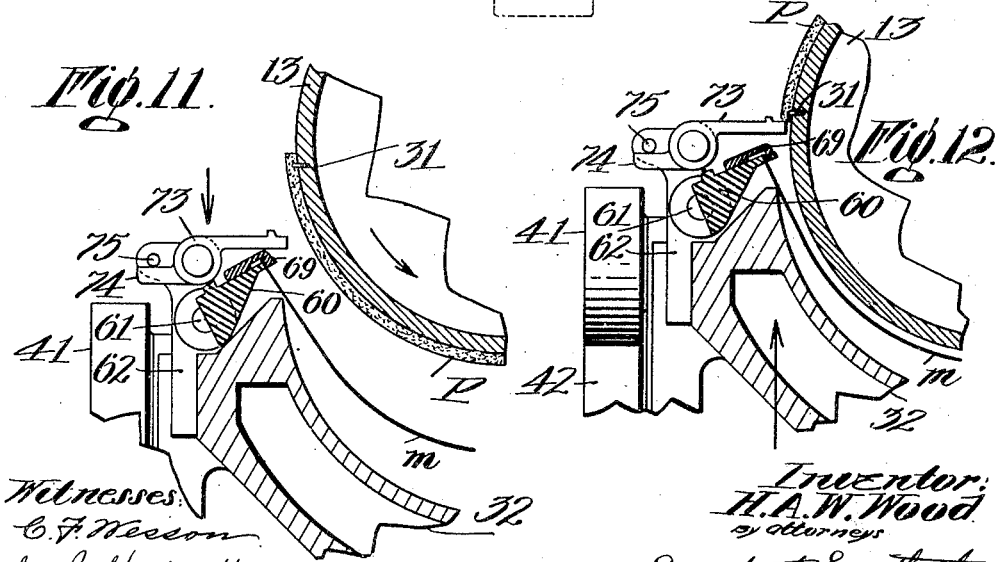

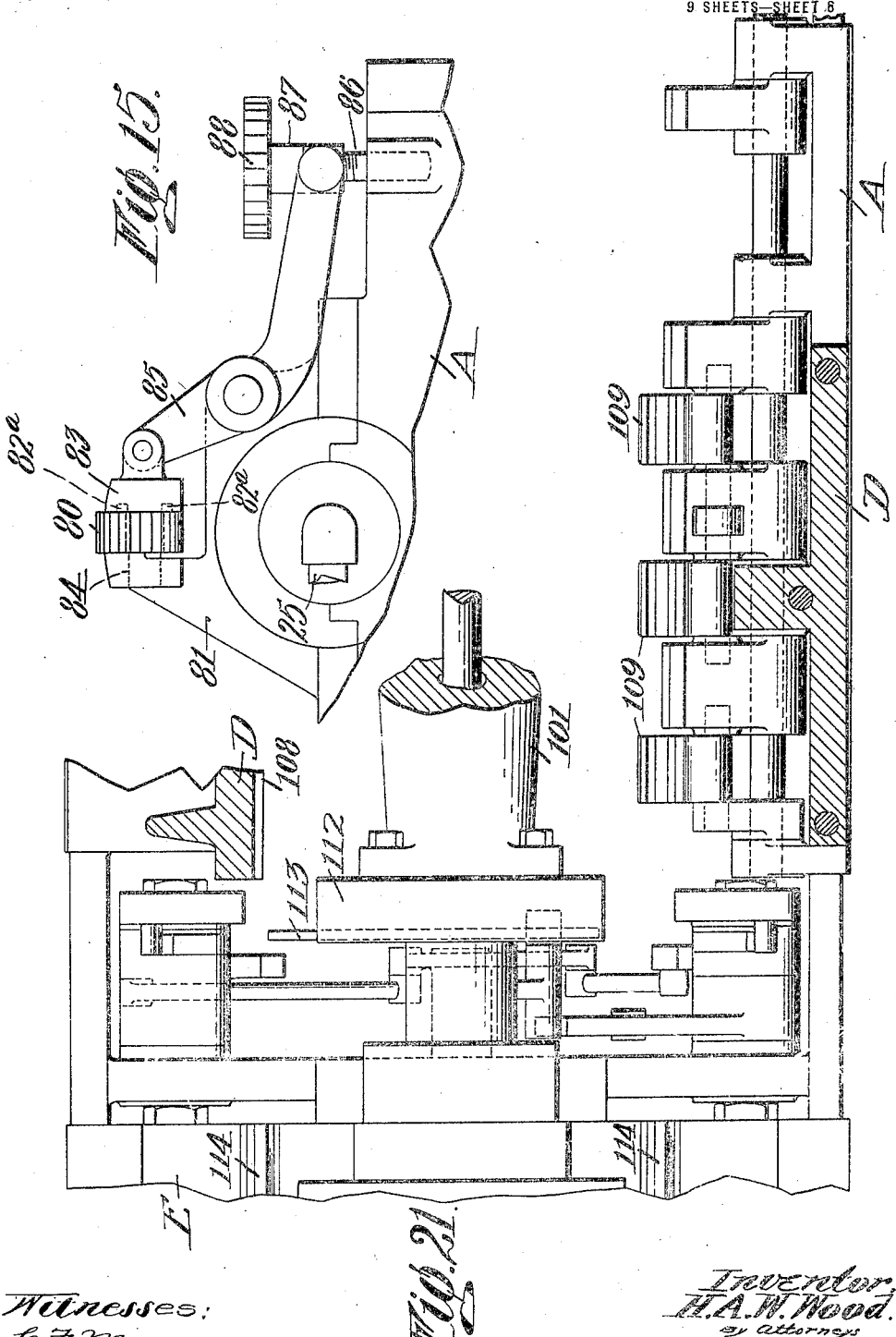

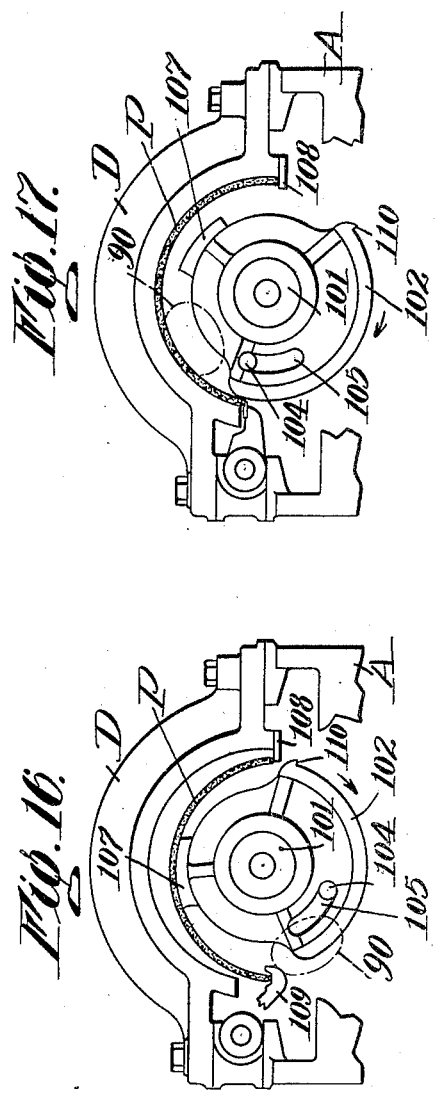
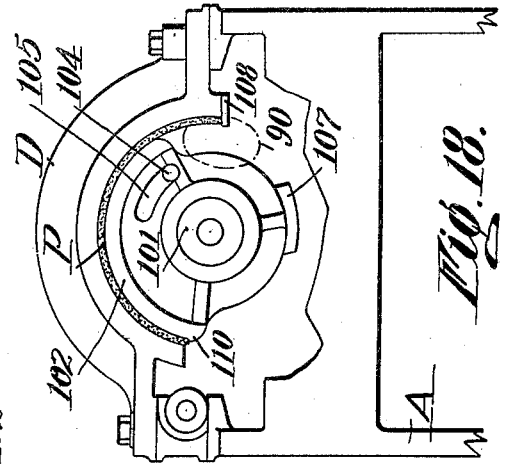
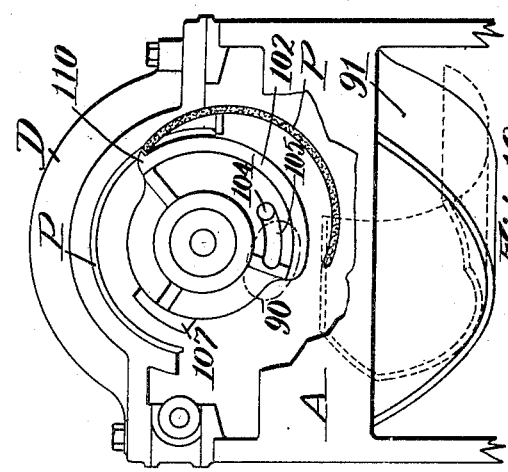
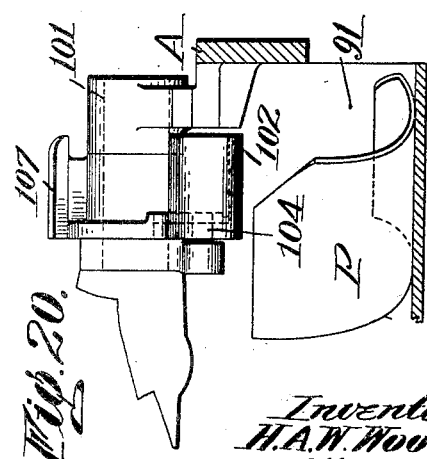

UNITED STATES PATENT OFFICE.

HENRY A. WISE WOOD, OF NEW YORK, N. Y., ASSIGNOR, BY MESNE ASSIGNMENTS, TO WOOD NEWSPAPER MACHINERY CORPORATION, OF NEW YORK, N. Y., A CORPORATION OF VIRGINIA.

MACHINE FOR CASTING, FINISHING, AND COOLING STEREOTYPE PRINTING-PLATES.

1,341,608.     Specification of Letters Patent.     Patented May 25, 1920.

Application filed October 17, 1912, Serial No. 726,239. Renewed October 13, 1919. Serial No. 330,520.

*To all whom it may concern:*

Be it known that I, HENRY A. WISE WOOD, a citizen of the United States, residing at New York, in the county of New York and State of New York, have invented a new and useful Machine for Casting, Finishing, and Cooling Stereotype Printing-Plates, of which the following is a specification.

This invention relates to the production of curved stereotype printing plates in condition ready to be applied to the press.

The principal objects of the invention are to produce a complete plate of this character by means such that the power required to handle the plate from the time it is cast until it is delivered in cooled condition will be reduced to a minimum, and practically no hand labor will be required in manipulating the plate in its progress through the machine or in handling the several tails which ordinarily are returned to the melting pot; and also to provide a construction in which all these operations can be controlled by a single operator. Other objects of the invention are to provide a construction in which the plate is cast at an inclination and delivered from the mold substantially in alinement with an inclined finishing mechanism at a lower level so that the plates can be delivered directly from the casting to the finishing mechanism and from that to the cooling mechanism by gravity, and yet there will be no necessity of handling the plate or even of lifting it except simply to such an extent as to free it properly from the inclined core on which it is cast; to provide improved means for delivering the plate from the inclined casting box into a position in alinement with the finishing mechanism, so that it is ready to be delivered thereto by gravity; to provide means on the casting mechanism for retaining the plate on the core while it is moved out of the back by the core, said means being readily detachable from the plate when the plate is lifted from the core; to provide means for operating the segmental back to coöperate with the core, and improved means for mounting the core in inclined position so that it is capable of performing the above mentioned operation; to provide for keeping the rate of travel of the plate from the casting to the finishing machine absolutely under the control of the operator; to provide means whereby the tails cut off the plate in the finishing mechanism will be delivered by gravity and arranged by gravity in proper position to be taken up by a conveyer and delivered back to the melting pot, and other improvements in details of construction and combinations of parts as will appear hereinafter.

Reference is to be had to the accompanying drawings in which—

Figure 1 is a front elevation of a machine constructed in accordance with this invention;

Fig. 2 is a plan of the same;

Fig. 3 is a perspective view of a part of the riser conveying chain;

Fig. 4 is a front view of the cylinder clutch driving mechanism;

Fig. 5 is a sectional view of the same on the line 5—5 of Fig. 4;

Fig. 6 is a front elevation of a part of the casting cylinder and associated parts;

Fig. 7 is an end view of the same;

Fig. 8 is a plan of the casting box and cylinder with the cylinder partly broken away to show interior parts;

Fig. 9 is a transverse sectional view on the line 9—9 of Fig. 8 showing the parts in casting position with a plate in the mold, and the plate shown elevated from the other side of the casting cylinder;

Fig. 10 is an enlarged transverse sectional view of a fragment of the cylinder and plate;

Fig. 11 is a view similar to one side of Fig. 9 showing the casting box in the act of being removed from casting position and the matrix being stripped;

Fig. 12 is a similar view showing the box and matrix returning to casting position;

Fig. 13 is a front elevation partly in central longitudinal section showing the connection between the casting cylinder and finishing mechanism;

Fig. 14 is an enlarged view of a portion thereof;

Fig. 15 is a fragmentary end view thereof;

Figs. 16, 17, 18 and 19 are end views showing four positions of the parts during the operation of clamping the plate in the arch and showing the tail frame;

Fig. 20 is a side elevation of the parts shown in Fig. 16, and

Fig. 21 is a view of a portion of the machine looking down on the same normally to the path of the movement of the plate therethrough.

In my Patent No. 1,269,239 granted June 11, 1918, I have shown a machine in which the finishing operation is performed in such a way that the plate is fed through the finishing means by the action of gravity, thus eliminating most of the labor of handling the plate during this operation without materially adding to the amount of power required for this purpose. The present invention involves the use of this principle, but in addition thereto the casting of the plate in such position that it is fed directly from the casting apparatus to the finishing apparatus without change in direction and without the employment of power to lift the plate except simply to free it from the mold in which it is cast, thus providing a cast plate in position to be delivered to the gravity finishing mechanism without necessitating the handling of the plate between these two operations. In this patent I have also illustrated the use of certain mechanisms which I have heretofore described in prior applications or patents as will appear hereinafter, and I do not wish to claim herein anything properly belonging in said other applications or patents.

Referring first to Figs. 1 and 2, the machine is illustrated as supported by a framework A which is provided at a distance above the floor with a platform B for the operator which is reached by means of steps, or the like. On the frame are arranged in inclined position and substantially in alinement with each other a casting mechanism C, and a finishing mechanism D. A cooling mechanism E is supported by the frame A also, at the end of the finishing mechanism. At one side of the frame near the casting mechanism is a melting furnace F. Extending from the finishing mechanism to this furnace is an arrangement G for transferring the tails or risers removed from the plates to the furnace for remelting.

The furnace and casting mechanism are driven by a motor K. This motor through suitable gearing drives a shaft 2 which in turn drives the stirrer 3 of the melting pot, which forms a part of the furnace. The melting furnace, as usual, has a pump operated by a handle H. The shaft 2 in turn drives a shaft 4 mounted in bearings at the top of the frame A. It is provided with a clutch member 5 fixed thereon, and therefore continuously rotated. Adapted to engage this clutch member is a longitudinally movable clutch member 6 fixed to a shaft 7 in alinement with the shaft 4 on the frame A. This clutch member has a groove in which works a roller 8 on a lever 9 which is normally pressed back by a spring 10 so that the clutch members will not be in operative engagement. On the lever 9 is an operating handle H² by which the movable clutch member can be moved into engagement with the clutch member 5 so as to rotate the shaft 7 with the shaft 4. The shaft 7 is provided with a bevel pinion 11 meshing with a bevel gear 12 which is fixed on the end of an inclined casting cylinder 13 which constitutes the core of the casting mechanism. Consequently the shaft 7 drives the core 13 at a slow rate of speed. On this cylinder is a cam 14 having in this case two depressions 15 diametrically opposed to each other, similar to the construction shown in my Patent No. 1,009,367 granted Dec. 21, 1911. On the lever 9 is a roll 16 which is in engagement with the edge of this cam. When the cam has rotated a half revolution from its starting point one of the depressions 15 will come into position for receiving the roll 16 which is pressed into it by the spring 10. This draws the clutch member 6 out of engagement with the clutch member 5 and stops the cylinder. In order to start it again the handle H² is operated.

The rotary cylinder or core 13 is mounted in inclined position on the face of the frame A and is hollow. It is supported by an inclined shaft 20 which is fixed in housings at its ends on the frame. The method of connection of the lower end is shown in Fig. 13, a bush bearing 21 being shown between the fixed shaft and the rotatable cylinder. This shaft is formed with an interior branched chamber 24 connected with a water supply pipe. It conducts water to a chamber 26 surrounding the shaft and inclosed by a cylindrical perforated shell 27. This shell is mounted on the shaft 20. The water escaping through the perforations impinges on the inside surface of the hollow cylinder 13 for the purpose of absorbing the heat and rapidly solidifying the plate. Openings 28 through the lower end of the cylinder allow the water to escape therefrom into a chamber 28ª formed in the frame A, and from there to a waste pipe 29 which conducts it away from the machine.

The cylinder 13, which constitutes the core of the casting box, is provided with depressions 29ª for casting lugs $p$ on the plate with two sets of teeth 30 on its outer surface for forming a rack $r$ on the concave side of each cast plate P. This cylinder is shown as furnished with hooks 31 (see especially Fig. 10), projecting from its surface and having a sharp edge projecting toward the edge of the plate so that the metal of the plate is cast around them and the plate is thus held to and supported by the cylinder so that the plate rotates with the cylinder. At the same time, the amount of metal cast beyond the hooks is small, so that the hooks can be caused to break through it in removing the plate from the core as is shown more clearly in Fig. 9.

The back 32 of the casting box is mounted to move toward and from the core. For this purpose a transverse shaft 33 is provided having a handle H³ thereon and provided with an arm 34 connected by a link 35 with the back. This shaft 33 is also provided with an arm 36 which is connected by a link 37 to an arm 38 on a shaft 39 which is provided with a counterweight 40. By this means the back can be moved toward and from the core, and its motion is assisted by the counterweight. The segmental back is provided with rollers 41 engaging guides or tracks 42 fixedly attached to the frame A so as to guide the box into and out of position. These rollers are mounted on brackets 43 on the box. The tracks 42 are provided with adjustable side guides 44 for the back. The motion of the handle H³ is limited by a stop 45 adjustably mounted on the frame A. This back is cooled by water entering through an inlet 46 and discharged through an outlet 47, both flexibly connected with the casting box. The segmental back is provided with the usual casting ring 50 confining one edge of the matrix m and mounted on a casting ring support 51. The usual bolster 52 forms a seal with the casting ring for the molten metal at this end of the box. The conical surface of the ring 50 is arranged for shaping the bevel edge of the plate. A tail sheet 54 is shown overlapping the matrix and forming a seal also at that end. This tail or pouring sheet is furnished on one of its edges with a gate or channel 55 for leading the molten metal from a spout 56 into the mold from the pump. This gate or channel consists of heat resisting material and is so fashioned that it may be removed from the box in a direction parallel with the axis thereof. The box, of course, is provided with an interior recess 57 into which the gate 55 fits. The gate is attached to part of the tail sheet 54. An ordinary fixed stop 58 is provided on the back for positioning the matrix longitudinally.

The back is provided with a pair of longitudinal clips 60 which are usual in this class of machines. These are shown as somewhat similar to those illustrated in my Patent No. 1,009,211 granted Nov. 21, 1911. They are mounted on pivots 61 in suitable bearings on brackets 62 and 63 attached to the sides of the box. The positions of these clips are shown in Figs. 9, 11 and 12. In Fig. 9 they are shown holding the matrix in position in the box for the casting operation, so that with the casting ring, the matrix which they hold, and the tail sheet 54, they provide a seal for the molten metal at the two straight side edges of the casting box.

Attached to the cylinder 13 are cam pieces 65 contacting with levers 66 rigidly attached to spring-seated pivot shafts 67 mounted on the brackets 62 and 63 and each rigidly connected to one of the clips 60. When the segmental back is brought to the casting position, the cam pieces 65 engage the levers 66 and move the clips into the position shown in Fig. 9, but when the segmental back moves away from the core as shown in Fig. 11, this contact ceases, and the spring on the shaft 67 moves these members back to the position shown in Fig. 11. Fig. 12 illustrates an intermediate position during the closing. These clips are provided with matrix clamping plates 69 operated by handles H⁴ in a manner similar to that shown in Fig. 13 of my above identified patent. The movement of the handle H⁴ in one direction causes the matrix clamping plates 69 to open so that the matrix may be placed in position or removed from the mold. On the pouring end of the cylinder is a projection ring 71 which in conjunction with the pouring sheet forms the seal at that end of the box. As shown in my Patent No. 1,009,211, levers 72 are provided for placing the matrix clips by hand in the "closed" position when the casting box is not in casting position. They are operated by hand levers H⁵.

Located adjacent to the clips are a pair of plate lifters 73, pivotally mounted on the box for supporting the plate on the cylinder and allowing it to slide by gravity away from the casting box. Each is provided with an arm 74 projecting in the opposite direction from the axis on which each turns to engage a stop pin 75 on the brackets 62 and 63 on which they are pivoted. It will be obvious that when the segmental back moves up into the positition shown in Fig. 9, these plate lifters will engage the plate on the cylinder as shown in that figure, and lift it away from the cylinder, at the same time forcing the hooks 31 to tear out of the metal. On the other hand, when the cylinder is rotated to deliver the plate, the plate lifters on one side will yield to permit this operation to take place.

It will be obvious that an inclined runway is provided parallel with the direction of the axis of the casting box, part of which is made up of these plate lifters. Therefore the plate when lifted up into the position shown in Fig. 9 is free to slide down the runway. For the purpose of retarding this motion and keeping the movement of the plate under the control of the operator, a retarding means is provided comprising in this instance a pair of toothed wheels 80 in position for the teeth thereof to engage in the teeth of the rack $r$ as the plate moves down the inclined runway. These wheels also assist in supporting the plate at this time. Each wheel is provided in the face thereof with a series of inserts 82 for affording a friction surface. These preferably are formed of cork. Adapted to bear against the faces of these wheels is a movable member 83 provided with similar inserts 82$^a$. Two studs 84, on which the wheels are mounted to rotate are provided on a bracket 81. The member 83 is pivoted to an arm of a lever 85 which is pivotally mounted on the bracket 81 on the frame of the machine. The other end of this lever is pivotally connected with an adjusting screw 86 which is tapped into the frame A. The screw is provided with a collar stud 87 for the reception of the end of the lever and with a hand wheel 88 by which it is adjusted. In this way it will be seen that the friction can be adjusted readily, and although gravity is depended upon for conveying the plate down the incline, the motion of the plate is entirely within the control of the operator.

The plate is fed down in this way under the control of the operator to the shaving arch of the finishing mechanism D, and while there the plate is clamped, rotated, and shaved in the manner indicated in my prior Letters-Patent on a "machine for finishing and cooling stereotype printing plates" No. 1,238,973, dated Sept. 4, 1917, or in any other desired way. At this time also the tail is cut off the plate by means of a moving rotatable saw 90 which also is operated in accordance with the principle set forth in the above identified patent or otherwise as may be desired. When the tails are dropped, they fall in a chute 91 and descend through it into engagement with an inclined platform 92. It will be seen that they lie in the chute in a direction with their axes parallel with the general direction of motion of the plate through the casting mechanism. When they engage the platform 92 the weight of the tails acted on by gravity causes the tails to be turned so that their axes are parallel with the direction of an endless conveyer 93. This conveyer is operated by a motor K$^2$ and is provided with a series of projections 94 on the chain thereof which engage the rear edges of the tails and convey them up the inclined conveyer trough 95 to a platform 96 above the melting pot F from which they can descend through a chute 97 into the melting pot. It will be understood also of course that plates to be remelted can be deposited on the conveyer by hand or otherwise and moved into the melting pot in the same way.

The mechanism for operating the shaving blade 100 and the tail cutting saw 90 is not shown herein in detail as it is the same in principle as that set forth in my above identified patent, but it is sufficient to say that it is preferably operated by a motor K$^3$ located under the frame and controlled by a lever or treadle H$^6$ in convenient position to be operated from the platform B by the foot of the operator. When this treadle is operated it starts the motor and also preferably causes the plate to be lifted to a firm seat in the shaving arch, as shown in my above identified Patent No. 1,238,973.

The shaving knife shaft 101 is provided with a tumbling pulley 102 fixed thereon and adapted to support the tail as it is sawed from the main part of the plate. The operation of this part of the mechanism is shown in Figs. 16 to 20 inclusive. This pulley is of segmental form and the tail is kept free from the top of the saw 90 by lugs $p$ cast on the inner side of the plate in position to contact with the edge of the pulley. This pulley is loosely mounted on the shaving shaft and is rotated with it part of the time by a driving pin 104 fixed on the shaving shaft engaging in an arcuate slot 105 formed in the web of the pulley. The beginning of the operation is shown in Fig. 16 in which the plate P is being clamped in the shaving arch D by the means shown in my above mentioned application, and the tail is supported on a projection 107 formed eccentrically on the tumbling pulley for this purpose. One edge of the plate rests on a guide 108 attached to the arch and the other rests on a pivoted receding track 109 as shown in my above identified patent. The shaving shaft and the tumbling pulley are at rest in this position of the parts. The driving pin 104 is engaged in the slot 105 at one end holding it from moving in the direction of the arrow in this figure. The rotary cutter 90 is indicated in dotted lines. Now assuming the shaving shaft to rotate in the direction of the arrow (Fig. 16) it moves the pin to the other end of the slot, and therefore picks up the tumbling pulley after the shaft is turned through a part of a revolution so as to bring the tumbling pulley against the edge of the plate which, in the meantime has been forced up into the arch by the movement of the track 109. The saw 90 moves of course with the shaving shaft, and the parts are now in the position shown in Fig. 17.

The next position of the parts is shown in Fig. 18 in which a projection 110 on the pulley engages the rear edge of the tail and acts to positively move it with the shaft. Fig. 19 indicates how the tail is dropped from the tumbling pulley after the saw has completely severed it. The tumbling pulley constitutes the sole support of the tail as soon as the saw passes from it at the right side of Fig. 18. The projection 110 on the side of the pulley engages the edge of the tail and as the shaft rotates, moves the tail around with the plate, but when it is rotated far enough for more than half of the weight of the tail to be on the right side, then the weight of the tail turns the loose pulley and brings the parts into the position shown in Fig. 19, the pin 104 coming then at the other end of the slot. Then the tail is free to fall away from the pulley by gravity and is deposited on the chute 91 as previously stated.

It will be understood, of course, in accordance with my above mentioned Patent No. 1,238,973 that while the tail is being cut from the plate the interior also has been shaved out by the shaving blade and the front edge trimmed up if desired. While these operations are performed the chips collect on an inclined surface 112 and are stopped by a plate 113 located at the bottom of the same to direct them into any convenient position. The plates being released then from the shaving arch by the operation of the treadle H⁹ slide down the incline on a horizontal track 114 constituting the support for the plates of the cooling trough E. When they come into this position they engage a lever 115 which, through the action of suitable connections similar to those shown in my Patent No. 1,238,973, cause the water to be turned on automatically to cool the plate. The details of this mechanism are not described in full, as the form shown in my said application can be employed. The operator can remove the plate from this trough all finished and cooled and ready to be applied to the printing press.

The device for delivering the stereotype printing plates and tails from the finishing machine and the printing plate itself are not claimed herein by themselves as they constitute the subject-matter of my two divisional application filed Jan. 14, 1920, Serial Nos. 351,366 and 351,365, respectively.

Although I have illustrated and described the machine in detail, I am aware of the fact that the principles herein involved can be carried out with other forms of mechanism, without departing from the scope of the invention as expressed in the claims, and I am also aware that the mechanism shown herein which is similar to that described in my previous applications and patents above identified can also be changed within the scope of this patent. Therefore I do not wish to be limited in these respects, but what I do claim is:—

1. In a machine for casting curved stereotype printing plates, the combination with a segmental back, of a tail sheet arranged therein and provided with a pouring gate at one side edge thereof.

2. In a machine for casting curved stereotype printing plates, the combination with an inclined segmental back, of a semi-cylindrical tail sheet arranged therein and provided with a pouring gate at one upper side edge thereof, extending down into the back.

3. In a machine for casting curved stereotype printing plates, the combination with an inclined segmental back, of a tail sheet arranged therein and provided with a pouring gate at one upper side edge thereof, extending down into the back, and removable longitudinally therefrom.

4. In a machine for casting curved stereotype printing plates, the combination with a segmental back, of a tail sheet arranged therein and provided with a pouring gate at one edge thereof, consisting of refractory material and located along the end of the upper side thereof, said back having a recess for receiving the pouring gate, said recess extending to the end of the back whereby the pouring gate can be removed from the back longitudinally.

5. In a device for casting curved stereotype printing plates, the combination with a back and a core, of means for moving one of the said parts relatively to the other, and plate lifters mounted on the back and adapted to engage the edges of the plate as the back and core come together after separating.

6. In a device for casting curved stereotype printing plates, the combination with an inclined back and a core, of means for moving said back downwardly from the core, and plate lifters mounted on the back and adapted to engage the edges of the plate as the back moves upwardly.

7. In a device for casting curved stereotype printing plates, the combination with a back, and core, of means for moving one of the said parts relatively to the other, plate lifters pivoted on the back and adapted to engage the edges of the plate as the back and core come together, and means for turning the core on its axis to bring a plate to delivering position, the plate lifters being arranged to swing on their pivots by contact with the cast plate as the core turns.

8. In a machine for casting curved stereotype printing plates, the combination of a core having pins projecting from its surface, a back coöperating with the core for casting a plate, the edges of which terminate just beyond said pins, means for turning the core to move the plate out of the back, and plate lifters adapted to engage under the edge of the core and move relatively to the core to force the plate therefrom, said plate lifters being arranged to terminate beyond said hooks, whereby when they act they will tear the pins out of the plate.

9. In a machine for casting curved stereotype printing plates, the combination of a core and back, said core having pins projecting therefrom adjacent to the edge of the plate to be cast, whereby the plate will be held on the core as the core turns, means for turning the core, and means for removing the plate from the core radially and tearing it from said pins.

10. As an article of manufacture, a core for a semi-cylindrical stereotype plate mold having hooks projecting from the surface thereof into a position to be embedded near the edges of the plate to be cast.

11. In a machine for casting printing plates, the combination of a mold having a stationary pin projecting into the interior thereof adjacent to the edge of the mold cavity, whereby the plate to be cast therein will embed such pin in it and be positively held on said mold, and means whereby the cast plate is forced positively away from said mold so as to tear it from said pin.

12. As an article of manufacture, a core for a semi-cylindrical stereotype plate mold having pins projecting from the surface thereof into a position to be embedded near the ends of the plate to be cast, and having teeth thereon between the two sets of pins to form a rack on the concave face of the plate.

13. In a machine for casting stereotype printing plates, the combination of an inclined segmental back and a rotatable cylindrical core parallel therewith, of a rotatable shaft, a second shaft having means for rotating the core, clutch members between said shaft, a cam on the core, means controlled by said cam for separating the clutch members when the core has made a half of a revolution, and means for moving said segmental back radially downward away from the core.

14. In a stereotype plate casting machine, the combination of an inclined fixed shaft, a cylindrical core, thereon, a back movable toward and from the core, said core having teeth longitudinally arranged thereon for casting a rack integrally on a printing plate, means for separating the back from the core, means for turning the plate on the core from the back, means for lifting the plate from the core and leaving it in position to slide down the incline, and means adjacent to the discharge end of the casting device for engaging said rack on the plate and retarding the movement of the plate down the incline.

15. In a machine for casting curved stereotype printing plates, the combination of a curved core adapted to turn on an inclined axis, a segmental back below the core adapted to move toward and from the core, and to coöperate therewith for the production of a curved stereotype printing plate, means for turning the core after the back is withdrawn for moving the cast plate around to the upper side thereof, means connected with the back for lifting the plate from the upper side of the core when the back moves to casting position, said core having teeth thereon for producing a cast rack along the plate, and means adjacent to the lower end of said core for engaging said rack and retarding the motion of the plate down the incline.

16. In a machine for casting curved stereotype printing plates, the combination of a core having means for casting a rack along a curved stereotype printing plate, said core being located in inclined position, means for separating the cast plate from the core, and leaving it in inclined position, whereby it may slide down the incline from the core, and means adjacent to the lower end of the core for engaging said rack and retarding the motion of the plate down the incline.

17. In a machine for casting curved stereotype printing plates, the combination of an inclined run-way, a core arranged along the run-way and provided with means for casting a rack along the concave side of a plate to be produced thereon, and means adjacent to the lower end of said core for engaging said rack and retarding the descent of the cast plate along said run-way.

18. In a machine for casting curved stereotype printing plates, the combination of an inclined run-way, a casting box arranged along the run-way and having means for casting a printing plate with a rack extending therealong, and means adjacent to the lower end of the casting box for engaging said rack and retarding the descent of the plate along the run-way.

19. In a machine for casting curved stereotype printing plates, the combination of an inclined run-way, a casting box arranged along the run-way and having means for casting a printing plate with a rack extending therealong, a toothed wheel adjacent to the lower end of the casting box for engaging the rack, and frictional means for preventing the rapid rotation of said wheel.

20. In a machine for casting curved stereotype printing plates, the combination of an inclined run-way, a casting box arranged along the run-way and having means for casting a printing plate with a rack extending therealong, a toothed wheel mounted to freely rotate in bearings in position to engage the teeth of said rack as the plate descends along the run-way from the casting box, a friction plate adapted to engage said wheel for retarding the rotation thereof, a lever connected with said friction plate, and hand-operated means for regulating the amount of friction between said plate and wheel.

21. In a machine for casting curved stereotype printing plates, the combination of an inclined run-way, a casting box arranged along the runway, a wheel mounted to freely rotate in bearings in position to engage the plate, a friction plate adapted to engage said wheel for retarding the rotation thereof, a lever connected with said friction plate, and means for regulating the amount of friction between said plate and wheel.

22. The combination with an inclined casting box, means for delivering a cast plate therefrom in inclined position, an inclined finishing mechanism in position to receive the plate from the casting mechanism by gravity and means for retarding the descent of the plate from the casting mechanism.

23. In a machine for producing curved stereotype printing plates, the combination of an inclined rotatable cylindrical core, an inclined segmental back coöperating therewith and located under the core, means for moving said back toward and from the core, means for turning the core to deliver a plate from the back on top of the core, means coöperating with the back for separating said plate from the core when the back moves toward the core, and a finishing mechanism located at an inclination in alinement with the position of the plate when so separated and in position to receive a plate directly from the casting mechanism.

24. In a machine for producing stereotype printing plates, the combination of an inclined casting mechanism, with a finishing mechanism located in alinement therewith and in position to receive a plate directly therefrom.

25. In a machine for producing curved stereotype printing plates, the combination with a casting box comprising a cylindrical core and a segmental back arranged in inclined position, of means for turning the core on its axis to deliver a plate from the back and leave it on the core with its axis in alinement with its original position, and a finishing mechanism located on an incline in alinement with the position of the plate when so delivered.

26. In a machine for producing curved stereotype printing plates, the combination with a casting box comprising a cylindrical core and a segmental back, of means for turning the core on its axis to deliver a plate from the back, means for freeing the plate from the core and leaving it in an inclined position while still thereon, and a finishing mechanism located at an incline in alinement with the position of the plate when so freed.

27. In a machine for producing curved stereotype printing plates, the combination of a cylindrical core, a movable back coöperating therewith, means for turning said core to deliver a plate from the back, means for freeing said plate from the core and leaving it thereon in a position at an inclination to the horizontal, and a finishing mechanism located at the same inclination and in alinement with the position of the plate when so freed.

28. In a machine for producing curved stereotype printing plates, the combination of a casting mechanism and a finishing mechanism both located at the same inclination, the casting mechanism having means for delivering a plate and freeing it therefrom at an incline in alinement with the finishing mechanism and above the same, whereby plates can be fed from said position to the finishing mechanism by gravity.

29. In a machine for producing stereotype printing plates, the combination with a casting mechanism located at an inclination, of a finishing mechanism located substantially at the same inclination below the casting mechanism and in position to receive a plate directly therefrom.

30. In a stereotype plate casting machine, the combination of an inclined run-way, a casting box arranged along the run-way, means at the lower end of the casting box for retarding the descent of a cast plate along the run-way, a melting pot for supplying the casting box with molten metal, means for removing the tails from the plates, and means for catching the tails and moving them back to the melting pot.

31. In a stereotype plate casting machine, the combination of casting box, a melting pot for supplying the casting box with the molten metal, means for removing the tails from the plates, and means for catching the tails and moving them back to the melting pot.

32. In a stereotype plate casting machine, the combination of a casting box, a melting pot for supplying the casting box with molten metal, means for removing the tails from the plates, a trough for receiving the tails from the tail removing means, and an elevator connected therewith for moving the tails upwardly to the top of the melting pot.

33. In a machine for casting stereotype printing plates, the combination of a casting box, means for cutting the tails from the plates, a melting pot for supplying the casting box with molten metal, means for receiving the cut tails from the cutting means, an endless chain conveyer in position to engage the tails discharged from the cutting means and having projecting members thereon for engaging said tails, and means for operating said conveyer to raise the tails up an incline to the top of said melting pot.

34. In a machine for casting stereotype printing plates, the combination with a melting pot and a casting box for receiving molten metal therefrom, of means for delivering the cast plate from the casting box, means for cutting the tail therefrom, means for receiving the tail at the side of the cutting means, and a conveyer movable in a direction transverse to the direction of the plate through the last named means and into position to engage the tail and move it into a position over the melting pot.

35. In a stereotype plate casting machine, the combination with the melting pot and the casting box, of means in alinement with the casting box for cutting the tails from plates cast therein, means for receiving the tails directly therefrom, a platform in position for receiving the tails and changing the direction of the axes thereof, and a conveyer in position to receive the tails and convey them in the direction in which their axes lie after engaging said platform.

36. In a machine for producing stereotype printing plates, the combination of a casting mechanism and a finishing mechanism both located at the same inclination, the casting mechanism having means for delivering a plate and freeing it therefrom at an incline in alinement with the finishing mechanism and above the same, whereby plates can be fed from said position to the finishing mechanism by gravity, with a cooling device located at the bottom of the finishing mechanism in position to receive the finished plates therefrom and support them.

37. In a machine for producing stereotype printing plates, the combination with a casting mechanism located at an inclination, of a finishing mechanism located substantially at the same inclination below the casting mechanism and in position to receive a plate directly therefrom, and a substantially horizontal support located at the bottom of the finishing mechanism in position to receive a finished plate therefrom.

In testimony whereof I have hereunto set my hand, in the presence of two subscribing witnesses.

HENRY A. WISE WOOD.

Witnesses:
BLODWEN W. JONES,
LILLIAN C. JONES.